United States Patent
Lin

(10) Patent No.: US 10,330,793 B2
(45) Date of Patent: **\*Jun. 25, 2019**

(54) UTC TIME OFFSET ESTIMATION AT A GNSS RECEIVER

(71) Applicant: QUALCOMM Incorporated, San Diego, CA (US)

(72) Inventor: Tong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/477,370

(22) Filed: Apr. 3, 2017

(65) Prior Publication Data

US 2017/0205511 A1 Jul. 20, 2017

Related U.S. Application Data

(63) Continuation of application No. 13/557,015, filed on Jul. 24, 2012, now Pat. No. 9,645,244.

(51) Int. Cl.
*G01S 19/33* (2010.01)

(52) U.S. Cl.
CPC .................................. *G01S 19/33* (2013.01)

(58) Field of Classification Search
CPC ......... G01S 19/33; G01S 19/23; G01S 19/235
See application file for complete search history.

(56) References Cited

U.S. PATENT DOCUMENTS

| | | |
|---|---|---|
| 5,923,287 A | 7/1999 | Lennen |
| 5,923,618 A | 7/1999 | Nelson, Jr. et al. |
| 6,181,274 B1 | 1/2001 | Pratt et al. |
| 2009/0129206 A1 | 5/2009 | Baba |
| 2011/0115672 A1 | 5/2011 | Lee |

(Continued)

FOREIGN PATENT DOCUMENTS

| | | |
|---|---|---|
| CN | 102281114 A | 12/2011 |
| CN | 102981403 A | 3/2013 |

OTHER PUBLICATIONS

Glonass, Interface Control Document, Edition 5.1, Dec. 31, 2008 (Dec. 31, 2008), pp. 1-4, XP055079041, Moscow Retrieved from the Internet: URL:facility.unavco.org/data/docs/ICD_GLONASS_5.1_(2008)_en.pdf [retrieved on Sep. 12, 2013].

(Continued)

*Primary Examiner* — Cassi J Galt
(74) *Attorney, Agent, or Firm* — Bala Ramasamy; Kilpatrick Townsend & Stockton

(57) ABSTRACT

Techniques are provided to quickly estimate a temporal shift of a GPS signal based on an analysis of a GLONASS signal. The shift can be a result of applied leap-second adjustments affecting GLONASS signals but not GPS signals. By identifying this shift, GPS and GLONASS signals can be considered together in order to estimate locations. The temporal shift can be determined, e.g., by estimating a separation between a GPS-signal frame feature (e.g., frame onset) and a GLONASS-signal frame feature (e.g., frame onset), or identifying coinciding frame features (e.g., a GPS-signal subframe coinciding with a GLONASS-signal string number). The techniques allow the temporal shift to be estimated based on an analysis of just a portion of the GPS-signal and GLONASS-signal frames, such that a speed of location estimations can be improved.

21 Claims, 6 Drawing Sheets

(56) References Cited

U.S. PATENT DOCUMENTS

2011/0167490 A1 7/2011 Yung et al.
2011/0312339 A1 12/2011 Kuningas et al.
2014/0028498 A1 1/2014 Lin

OTHER PUBLICATIONS

International Search Report and Written Opinion—PCT/US2013/049862—ISA/EPO—dated Sep. 19, 2013.
Urlichich Y., et al., "Glonass Developing Strategy", GNSS 2010—Proceedings of the 23rd International Technical Meeting of the Satellite Division of the Institute of Navigation (ION GNSS 2010), The Institute of Navigation, 8551 Rixlew Lane Suite 360 Manassas, VA 20109, USA, Sep. 24, 2010 (Sep. 24, 2010), pp. 1566-1571, XP056000271.
Zinoviev, A.E., "Using Glonass in Combined GNSS Receivers: Current Status," ION GNSS 18th International Technical Meeting of the Satellite Division, Sep. 2005, pp. 1046-1057.

UTC TIME OFFSET ESTIMATION AT A GNSS RECEIVER

CROSS-REFERENCE TO RELATED APPLICATIONS

This application is a continuation of co-pending U.S. patent application Ser. No. 13/557,015, filed Jul. 24, 2012, entitled "UTC Time Offset Estimation at a GNSS Receiver" which is incorporated herein by reference in its entirety for all purposes.

BACKGROUND

Global navigation satellite systems (GNSS) are increasingly used in a variety of contexts to achieve location-related capabilities. Generally, GNSS systems can receive signals from a set of satellites. Each signal can be decoded, the decoded signal indicating which satellite transmitted the signal and when it was transmitted. By analyzing a set of signals, a device (e.g., a vehicle-integrated device or mobile device) can estimate an absolute location of the device. Based on the estimated location, various information may be identified and presented to the user, such as directions from the estimated location to a destination.

BRIEF SUMMARY

Techniques are provided to quickly estimate a temporal shift of a global positioning satellite (GPS) signal based on an analysis of a Global Navigation Satellite System (GLONASS) signal. The shift can be a result of applied leap-second adjustments affecting GLONASS signals but not GPS signals. By identifying this shift, GPS and GLONASS signals can be considered together in order to estimate locations. The temporal shift can be determined, e.g., by estimating a separation between a GPS-signal frame feature (e.g., frame onset) and a GLONASS-signal frame feature (e.g., frame onset), or identifying coinciding frame features (e.g., a GPS-signal subframe coinciding with a GLONASS-signal string number). The techniques allow the temporal shift to be estimated based on an analysis of just a portion of the GPS-signal and GLONASS-signal frames, such that a speed of location estimations can be improved.

In some embodiments, a method for estimating a number of applied leap-second adjustments is provided. The method can include accessing a GLONASS signal. The method can also include determining a frame-related feature of the GLONASS signal. The method can further include estimating the number of applied leap-second adjustments based on the determined frame-related feature of the GLONASS signal.

In some embodiments, a device for estimating a time-related parameter is provided. The device can include one more receivers configured to receive a GLONASS signal from a GLONASS satellite. The device can also include one or more frame feature detectors configured to detect a GLONASS frame feature in the GLONASS signal. The device can further include a leap-second adjustment estimator configured to estimate the time-related parameter based on the detected GLONASS frame feature, the time-related parameter being dependent on a number of applied leap-second adjustments.

In some embodiments, a computer-readable medium is provided. The computer-readable medium can contain a program which executes the steps of: accessing a GLONASS signal; determining a frame-related feature of the GLONASS signal; and estimating a number of applied leap-second adjustments based on the determined frame-related feature of the GLONASS signal.

In some embodiments, a system for estimating a time-related parameter is provided. The system can include means for accessing a GLONASS signal. The system can also include means for determining a frame-related feature of the GLONASS signal. The system can further include means for estimating the number of applied leap-second adjustments based on the determined frame-related feature of the GLONASS signal.

In some embodiments, a method for estimating a number of applied leap-second adjustments is provided. The method can include accessing a first signal, the first signal comprising either a GLONASS signal or a GPS signal, the first signal being associated with a first time. The method can further include identifying a second time. The second time can include a GPS time if the first signal is a GLONASS signal. The second time can include a GLONASS time if the first signal is a GPS signal. The second time can correspond to the first time. The method can also include estimating the number of applied leap-second adjustments based on the first signal and the second time.

In some embodiments, a device for estimating a time-related parameter is provided. The device can include a receiver configured to receive a GLONASS signal from a GLONASS satellite or a GPS signal from a GPS satellite. The device can also include a time detector configured detect a time associated with the received signal. The second time can include a GPS time if the first signal is a GLONASS signal. The second time can include a GLONASS time if the first signal is a GPS signal. The second time can correspond to the first time. The device can further include a leap-second adjustment estimator configured to estimate the time-related parameter based on the received signal and the detected time, the time-related parameter being dependent on a number of applied leap-second adjustments.

In some embodiments, a computer-readable medium is provided. The computer-readable medium can contain a program which executes the steps of: accessing a first signal, the first signal comprising either a GLONASS signal or a GPS signal, the first signal being associated with a first time; identifying a second time, the second time comprising a GPS time if the first signal is a GLONASS signal, the second time comprising a GLONASS time if the first signal is a GPS signal, the second time corresponding to the first time; and estimating the number of applied leap-second adjustments based on the first signal and the second time.

In some embodiments, a system for estimating a number of applied leap-second adjustments is provided. The system can include means for accessing a first signal, the first signal comprising either a GLONASS signal or a GPS signal, the first signal being associated with a first time. The system can also include means for identifying a second time. The second time can include a GPS time if the first signal is a GLONASS signal. The second time can include a GLONASS time if the first signal is a GPS signal. The second time can correspond to the first time. The system can further include means for estimating the number of applied leap-second adjustments based on the first signal and the second time.

DETAILED DESCRIPTION

Figure 1:
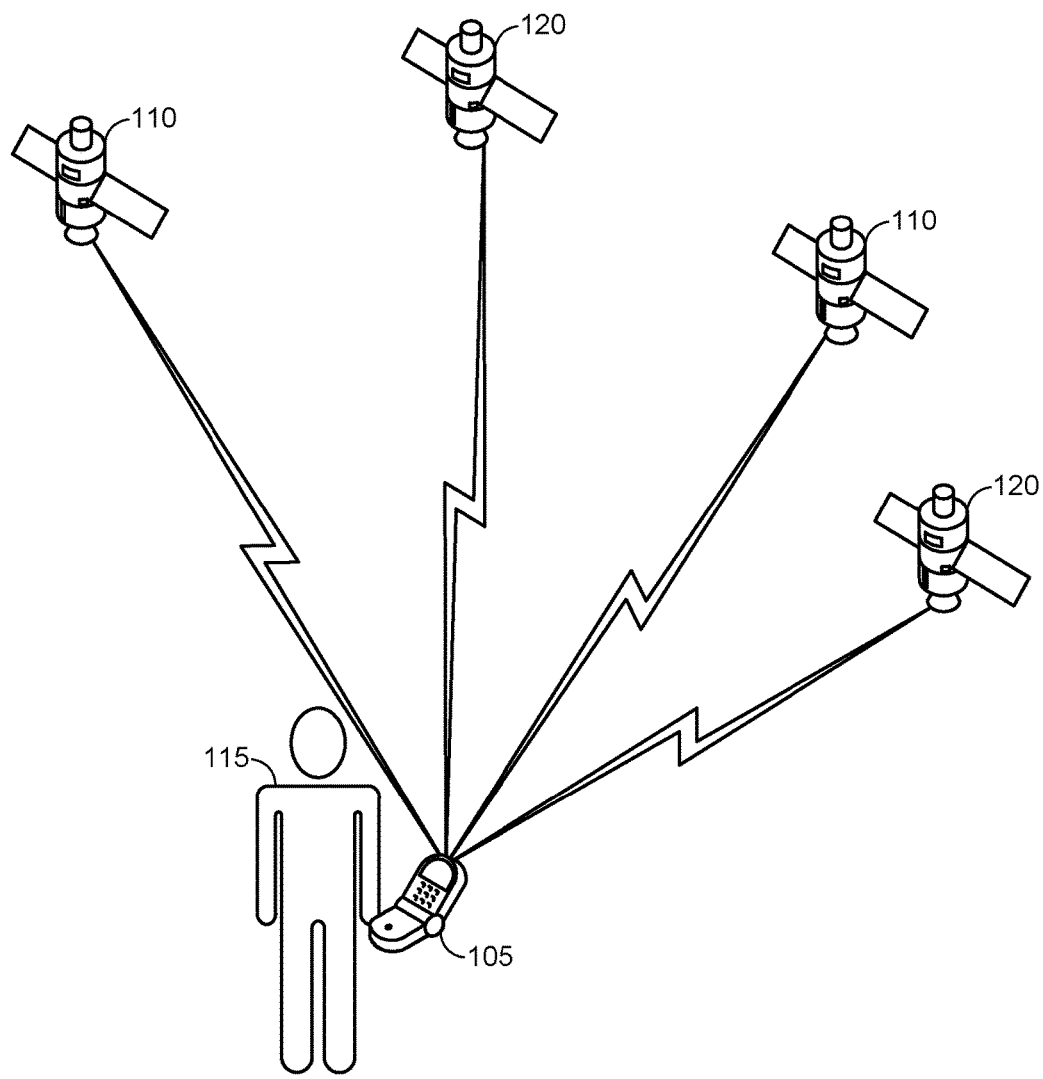
FIG. 1 illustrates an instance in which a mobile device can communicate with a set of satellites in order to estimate its location.

Traditionally, a global navigation satellite (GNSS) system is a global positioning satellite system (GPS) or a Global Navigation Satellite System (GLONASS). Each system includes a set of satellites that orbit the Earth along known trajectories and transmit regular signals. A GPS or GLONASS receiver near the Earth's surface can receive signals from respective satellites. The receiver includes a clock, which is used to identify time differences between when a satellite transmitted a signal and when it was received by the receiver. By analyzing a set of signals, a device can estimate its location relative to each of a set of satellites, and further estimate its own absolute location.

GPS and GLONASS receivers include different clock systems. GLONASS clocks are locked to the Coordinated Universal Time (UTC) time scale, while GPS clocks operate using a continuous time scale that is not locked to the UTC time scale. Therefore, GLONASS clocks (but not GPS clock) account for the UTC "leap seconds." Leap seconds are whole second adjustments made to reconcile atomic-frequency standards with the astronomical time of day. Leap-second adjustments may be added on June 30 and/or on December 31 of any given year depending on whether a reconciliation is needed. It is possible to convert a GPS system time to a GLONASS system time (or UTC time) with accuracy, if the total number of previous leap-second adjustments is known (e.g., using knowledge of how many adjustments were implemented and the magnitude of the adjustment).

GPS signals include "messages" that are 12.5 minutes long. The message includes 25 30-second frames, each framing including five subframes. The data in subframes 1-3 is the same across the 25 frames, but the data in subframes 4-5 varies across the frames and is indexed according to "pages". Each GPS message includes information that identifies the leap-second correction. However, this information is included only once per message (subframe 4, page 18). Thus, it can take 12.5 minutes to receive this data.

Some embodiments of the invention allow for the cumulative leap-second adjustments to be quickly estimated by analyzing a GLONASS signal with respect to a GPS signal. As used herein, "cumulative" leap-second adjustments indicates a combined total of all implemented leap-second adjustments. This summed variable allows for a GPS-system time to be converted to a GLONASS-system or UTC-system time. However, it is to be appreciated that the disclosure could be extended to estimating other leap-second variables (e.g., total leap-second variables within the past year or at a particular time point). This may be particularly advantageous when, e.g., a device has stored or received another variable identifying total adjustments occurring previous to an instant time period.

GPS signals include 30-second frames, each of which includes five 6-second subframes. GLONASS signals also include 30-second frames, each of which includes fifteen 2-second strings. If no leap-second adjustments were made, GPS-signal frames and GLONASS-signal frames would begin at the same time, and GLONASS strings would have a fixed correspondence to GPS subframes. Thus, an estimate of the actual leap-second adjustments may be made identifying occurrences of frame features. For example, coinciding intra-frame features can be identified (e.g., determining which GLONASS string and which portion of the string coincided with a beginning of a GPS subframe), or a separation between two mapped features can be identified (e.g., a beginning of a GLONASS frame and a beginning of a GPS frame). Based on the frame-feature analysis, a cumulative leap-second adjustment can be determined.

By quickly and accurately estimating cumulative leap-second adjustments, accuracy of a GPS clock can be improved, thereby improving accuracy of one or more GNSS systems that rely on the GPS clock. For example, clock accuracy can improve estimates of a satellite's navigation by using navigation correction equations. Further, clock accuracy can allow for accurate SV search data to be quickly generated, thereby reducing time required to locate a SV, acquire signals from the SV, and track the SV. Even further, when multiple navigation systems are used (e.g., both GPS and GLONASS), accurate clocks in each may allow for improved synchronization between the systems, leading to improved system integration, faster time to position fixes, and more accurate location estimates. Finally, accurate times may be provided in transmitted signals to external entities.

FIG. 1 illustrates an instance in which a mobile device 105 can receive signals from with a set of satellites 110 and/or 120 in order to estimate its location. Specifically, mobile device 105 can receive signals from one or more GPS satellites 110 and/or one or more GLONASS satellites 120. Mobile device 105 can include any device that a user 115 is likely to carry on his person and that can communicate with satellites 110 and 120 as described herein. Mobile device 105 can include, e.g., a phone, a smartphone, an electronic device, or a laptop. In some instances, a non-mobile device and/or vehicle accessory can be used in place of mobile device 105.

Figure 2:
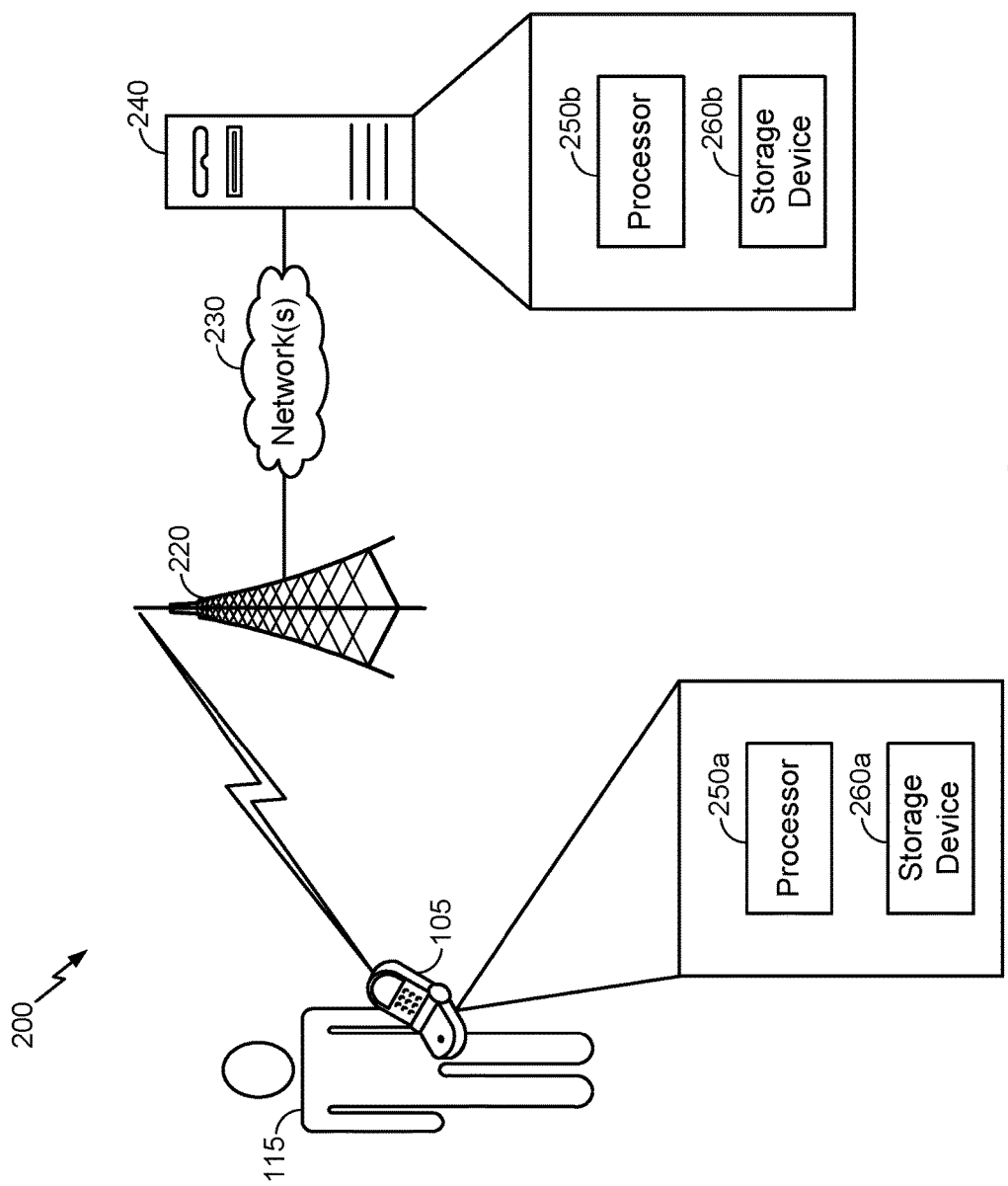
FIG. 2 illustrates communications between a mobile device and a remote server.

FIG. 2 illustrates additional communications that can involve mobile device 105. Mobile device 105 can communicate with a remote server 240 via a wireless network 220 and network(s) 230. Wireless network 220 can represent a cellular service provider's wireless network. Wireless network 220 can use one or more network(s) 230 to communicate with remote server 240. Network(s) 230 can include one or more private networks, such as a corporate intranet, and/or one or more public networks, such as the Internet. Mobile device 105 can include a transmitter configured to transmit radio signals, e.g., over a wireless network. Mobile device 105, as shown in FIG. 2, can include a variety of sensors (not shown or labeled), such as a microphone.

A processor 250*a* in mobile device 105 can process signals (e.g., received from satellites 110 and/or 120) and estimate a location of mobile device 105. In some instances, data is transmitted to remote server 240, and processor 250*b* of remote server 240 can perform some or all of the signal processing and/or location estimation. Storage devices 260a and/or 260b can store data, such as estimated locations or estimated clock biases.

As illustrated in FIG. 1, mobile device 105 can be capable of communicating with multiple types of satellites, such as a GPS satellite 110 and a GLONASS satellite 120. Currently, over 30 GPS satellites 110 and over 20 GLONASS satellites 120 are in orbit. Receiving signals from both GPS satellites 110 and GLONASS satellites 120 can enable mobile device 105 to locate satellites and acquire satellite signals quickly and to improve location estimations.

Mobile device 105 can receive a signal from a satellite 110 or 120 that includes a pseudorandom noise code and data that identifies a location of satellite 110 or 120. Mobile device 105 can detect a time at which the signal was received (using a local clock). Further, by estimating a delay between a self-generated version of the pseudorandom noise code and the received pseudorandom noise code (the codes being identical but shifted), mobile device 105 can estimate when a satellite transmitted the signal. Thus, a travelling time can be estimated based on the estimated transmission time and the detected receipt time. A distance separating mobile device 105 from satellite 110 or 120 can be estimated by multiplying the traveling time by the speed of light. Thus, mobile device 105 can estimate that it is located on a surface of a sphere with a radius equal to the estimated distance centered on the satellite's location.

By analyzing multiple signals, mobile device 105 can estimate its absolute location using trilateration. However, even a small clock bias can dramatically influence an accuracy of a location estimation. To combat such error, a least-squares error minimization technique can be applied to simultaneously perform the trilateration and estimate a clock bias.

This technique assumes a common clock bias and that received signals are operating within a same temporal system. Meanwhile, the illustration in FIG. 1 is operating in two temporal systems—signals received from GLONASS satellite 120 are locked to the UTC system and account for leap seconds, while signals received from GPS satellite 110 do not account for leap seconds. Embodiments of the invention allow mobile device 105 to quickly and accurately estimate leap-second adjustments, such that signals from all satellites 110 and 120 can be analyzed in a comprehensive and integrative manner.

Figure 3:
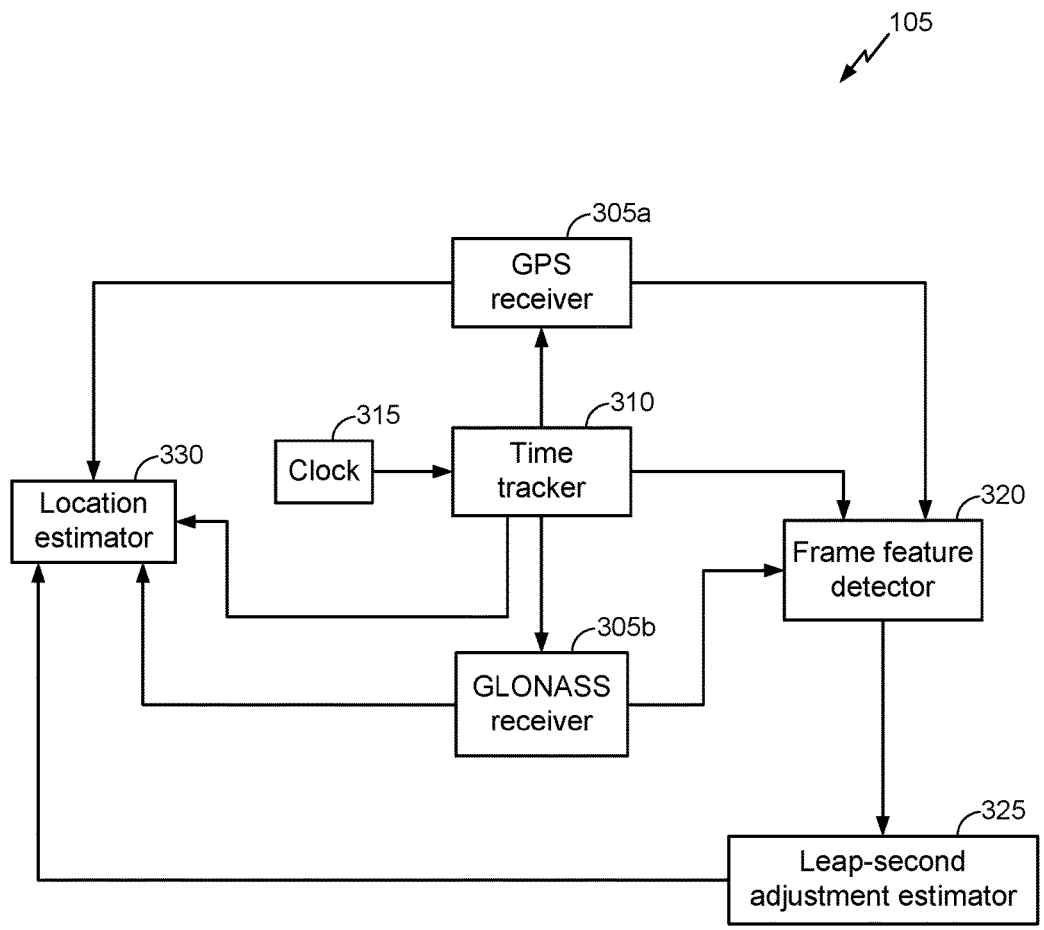
FIG. 3 is a block diagram showing an exemplary mobile device

FIG. 3 is a block diagram showing exemplary components in mobile device 105 to achieve location capabilities according to an embodiment of the invention. Mobile device 105 can include a GPS receiver 305a configured to receive signals from GPS satellite 110 and a GLONASS receiver 305b configured to receive signals from GLONASS satellite 120. In some instances, GPS receiver 305a and GLONASS receiver 305b are combined in a single receiver configured to receive signals from both GPS satellites 110 and GLONASS satellites 120.

A time tracker 310 can identify a time to associate with a received signal. The time can include, e.g., an absolute time, a local time, a GPS time or a GLONASS time. The time can be determined based on a clock time identified by a clock 315. Clock 315 can comprise, e.g., a crystal oscillator referenced clock. Time tracker 310 can determine a time by, e.g., adding or subtracting an offset to (or otherwise adjusting) a clock time.

An offset or adjustment to be applied to a local time can be determined, e.g., to account for small errors of the clock or to account for differences between clock systems (e.g., a difference between a local time and a GPS time, a difference between a local time and a GLONASS time, or a difference between a local time and a UTC time). Thus, in some instances, time tracker 310 stores a priori information about a GPS and/or GLONASS time and uses the a priori information to convert a local time to a GPS and/or GLONASS time.

The offset or adjustment can be determined based on an analysis of previously received GPS and/or GLONASS signals. For example, a GLONASS time (and thus an offset between a local time and GLONASS time) can be determined by analyzing a sufficient number of GLONASS signals received substantially simultaneously. As another example, a GPS time (and thus an offset between a local time and GPS time) can be determined by analyzing a sufficient number of GPS signals received substantially simultaneously. In some instances, the offset or adjustment is determined by determining a difference between a local time and a time identified in a a signal from a remote server.

A GPS signal received by GPS receiver 305a and/or a GLONASS signal received by GLONASS receiver 305b can be fed to a frame feature detector 320. Frame feature detector 320 can detect frame-related feature in the GPS signal and/or GLONASS signal. A frame-related feature can include, e.g., a beginning of a frame, a data sync word, a string or subframe number associated with a particular time and a portion or a string or subframe associated with a particular time. For example, frame feature detector 320 can identify a string number in a GLONASS signal that coincides with a subframe number in a GPS signal. As another example, frame feature detector 320 can identify a portion of a string in a GLONASS signal that coincides with a header-element (e.g., a start of a preamble) in a GPS signal.

In some instances, frame-feature detector 320 further detects a frame feature and identifies an associated time (e.g., as identified by time tracker 310 or based on a time identified by time tracker 310). For example, frame feature detector 320 can detect at which time (e.g., at which GPS time) a particular frame or string number (e.g., of a GLONASS signal) began. Thus, e.g., frame feature detector 320 could determine that string #1 began at $t_{sn}$ seconds relative to a start of a GLONASS signal. If time tracker 310 indicated that the start of the GLONASS signal was associated with a GPS time $t_{GPS}$, a GPS time associated with string #1 could be defined as $t_{sn}+t_{GPS}$.

Frame feature detector 320 can transmit data about the detected frame features (e.g., a string number, a subframe number, a portion of a string or subframe, and/or a time) to a leap-second adjustment estimator 325. Leap-second adjustment estimator 325 can further receive a time, such as a time identified by time tracker (e.g., which can be directly sent to leap-second adjustment estimator 325 or sent via frame feature detector 320) or a time associated with a detected frame feature by frame feature detector 320.

Leap-second adjustment estimator 325 can estimate a clock offset between the GPS and GLONASS systems, which can reflect the cumulative number of leap-second adjustments applied under the UTC system. Specifically, each possible clock offset can result in a discrete shift in GPS intra-frame features relative to GLONASS intra-frame features. Thus, leap-second adjustment estimator 325 can identify coinciding frame features, time differences between mapped frame features (e.g., beginnings of frames), and/or system times associated with frame features (e.g., a GPS system time associated with a GLONASS frame feature or a GLONASS system time associated with a GPS frame feature). Based on this information, leap-second adjustment estimator can estimate the offset between the GPS and GLONASS systems.

In some instances, the estimation includes estimating a time at which a previous (e.g., most recent) or future (e.g., next) frame did or will begin. This estimation can depend on an identification of, e.g., when specific intra-frame features were detected. In some instances, one or more assumptions or constraints are applied by leap-second adjustment estimator, such as a constraint applies an upper bound (e.g., 6 seconds) defining a maximum estimated cumulative leap-second adjustment.

GPS and GLONASS signals can be transmitted to a location estimator 330. In some instances, these signals are the same signals as those analyzed by frame feature detector 320. In some instances, they are different. Location estimator 330 can estimate a distance separating mobile device 105 and each of a set of satellites 110 and/or 120, along with a clock bias. Even though GPS and GLONASS signals may be locked to different clocks, location estimator 330 can account for this difference due to the estimated cumulative leap-second adjustments determined by leap-second adjustment estimator 325.

While FIG. 3 shows an embodiment in which mobile device 105 includes the depicted components, in some embodiments, remote server 240 can include some of these components. For example, mobile device 105 can include GPS receiver 305a, GLONASS receiver 305b, time tracker 310 and clock 315, and remote server 240 can include the leap-second adjustment estimator 325 and location estimator 330.

Figure 4:
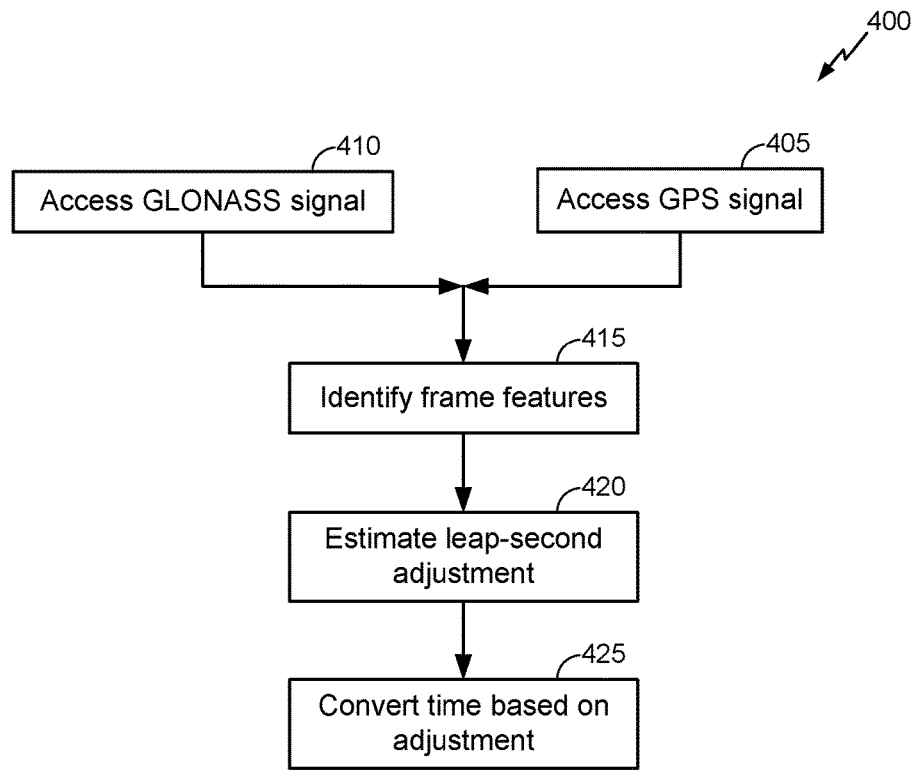
FIG. 4 is a flow diagram of a process for converting between GPS-system time and GLONASS-system time according to an embodiment of the invention.

FIG. 4 is a flow diagram of a process 400 for converting between GPS-system time and GLONASS-system time according to an embodiment of the invention. Part or all of process 400 can be performed by mobile device 105.

At block 405, a GPS signal is accessed, and at block 410, a GLONASS signal is accessed. For example, GPS receiver 305a can receive the GPS signal and GLONASS receiver 305b can receive the GLONASS signal. The signals can be accessed in any order (e.g., the GLONASS signal before the GPS signal, the GPS signal before the GLONASS signal, or substantially simultaneously). The GPS signal and GLONASS signal can include signals that were received (e.g., by mobile device 105) at similar times. In some instances, at least part of the GPS signal was received at a same time as at least part of the GLONASS signal. In some instances, only one of block 405 or block 410 are performed (e.g., such that a GPS signal is accessed but not a GLONASS signal or the converse). The accessed signal(s) can be associated with a time. For example, a GLONASS signal can be associated with a local time at which it was received or a GPS time associated with the signal's receipt (based on a local time and a GPS offset).

At block 415, one or more frame features are identified. The frame features can include a current frame feature (i.e., a feature of a frame just received in a signal at mobile device 105) or a past frame feature (e.g., a start of a current frame, subframe or string). The identified one or more frame features can include one or more features associated with the GPS signal and/or with the GLONASS signal. In some instances, a future frame feature (i.e., a frame feature that will occur in a signal received in the future at mobile device 105) can be predicted based on a current and/or past frame feature.

The frame feature can include a start of a frame; a subframe number; a string number; and/or a portion of a frame, subframe or string (e.g., a header of a subframe). In some instances, the identification includes determining a time associated with a frame feature. For example, an identification can include that a current string in a GLONASS signal is "string 3" and that it began 1.3 seconds ago.

In some instances, block 415 involves identifying coinciding frame features. For example, a GLONASS-signal feature and a GPS-signal feature that occurred at a particular point in time (e.g., an approximate current time) can be identified. As another example, a GLONASS-signal feature that coincided with a particular GPS-signal feature (e.g., a preamble of a subframe) can be identified or the converse.

In some instances, block 415 involves identifying a time of two mapped frame features or a time difference between the two mapped frame features. For example, a time at which a GLONASS-signal frame began and at which a GPS-signal frame began can be identified. As another example, a time difference between when a GPS-signal subframe began and when a specific GLONASS-signal string number began can be identified. To specifically illustrate one instance of this example, a time difference between when GPS-signal subframe x began and when GLONASS-signal string number x*3 began can be identified.

In some instances, block 415 involves identifying a time at which a frame feature occurs. For example, block 415 can involve detecting a frame feature (e.g., a GLONASS frame feature) and determining a time (e.g., a GPS time) associated with the detected frame feature. This can be performed, e.g., by accessing a local time associated with a point in the signal (e.g., a time at which it was received) and adjusting the local time based on a stored offset (e.g., between a local time and a GPS time) and based on the time associated with the detected frame feature. This can also be performed, e.g., by accessing a non-local time (e.g., a GPS time) associated with a point in the signal and adjusting the non-local time based on the time associated with the detected frame feature.

At block 420, a cumulative leap-second adjustment is estimated based on the identified one or more frame features. The alignment of a GPS frame with a GLONASS frame depends on the cumulative leap-second adjustments. If no adjustments had occurred, then the frames would start simultaneously, and each GPS subframe numbered x would correspond to exactly three GLONASS strings numbered x*3−2, x*3−1 and x*3. Meanwhile, each adjustment causes a start of the GPS frame to become progressively more delayed relative to a start of GLONASS frame. Thus, by identifying which intra-frame features are actually aligned or by identifying a GPS/GLONASS time associated with a GLONASS/GPS frame feature, the cumulative leap-second adjustments can be estimated.

It will be noted that, theoretically, multiple cumulative leap-second adjustments can be estimated based on temporal relationships between frame features. For example, a cumulative adjustment of 13 seconds can have a same alignment effect as a cumulative adjustment of 43, 73, and 103 seconds. However, leap-second adjustments occur infrequently: from 2002-2012, three 1-second leap-second adjustments were implemented. Thus, the estimate at block 420 can constrain the estimate using an absolute threshold or by restricting a change compared to a previously identified (e.g., historic or previously estimated) cumulative leap-second adjustments. In the above example, the estimates of 43, 73 and 103 seconds can be disregarded due to these types of constraints—resulting in a single estimate.

At block 425, a time is converted based on the estimated adjustment. For example, a time can be converted from a GPS system to the GLONASS system or from the GLONASS system to the GPS system. As another example, a time can be converted from a GPS system to the UTC system or from the UTC system to the GPS system. The conversion can involve adding or subtracting the cumulative leap-second adjustments.

Figure 5:
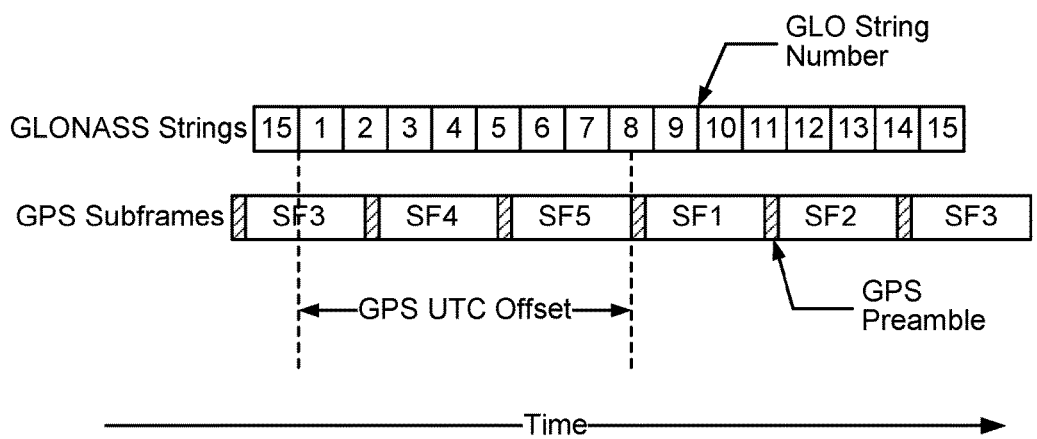
FIG. 5 shows an example of how frame features can be used to estimate cumulative leap-second adjustments.

FIG. 5 shows an example of how frame features can be used to estimate cumulative leap-second adjustments. As shown, a GLONASS signal can include a frame with fifteen strings. A GPS signal includes a frame with five subframes. Each subframe consists of ten words: the first word is a telemetry preamble word, the second word is a handover word, and the remaining words indicate additional data. Specifically, the remaining words in the first subframe identify the satellite clock time and GPS time relationship, the remaining words in the second and third subframes indicate a precise satellite orbit called ephemeris, and the remaining words in the fourth and fifth subframes are the almanac component and indicate information and status of all GPS satellites.

If no leap-second adjustments had been made, then the beginning of string 1 in the GLONASS signal would be aligned with the beginning of the preamble in subframe 1 in the GPS signal. Leap-second adjustments result in a shift in this alignment.

A cumulative leap-second adjustment can be estimated as a time shift between the beginning of a GLONASS-signal frame and a next beginning of a GPS-signal frame. Thus, in some embodiments, the frame onsets are detected, and the time difference is determined. However, other approaches can hasten the estimation. For example, by detecting a current or past intra-frame feature, onset of a next or previous frame can be estimated. For example, if a start time of subframe 3 is known, then an onset of the next GPS-signal frame can be estimated to be the subframe-3 start time plus 18 seconds.

In some instances, an actual or calculated time reference of the starting point of a GPS-signal subframe is compared to a time reference of the starting point of a GLONASS-signal string. To illustrate, one scenario can include detection of onset of a GPS-signal subframe 4 just subsequent to beginning decoding efforts and detection of onset of GLONASS-signal string number 3 approximately 0.5 seconds later. Based on the onset times of the intra-frame features, an onset time of a next GPS frame can be predicted, and a previous onset time of a current GLONASS frame can be predicted. These two variables are related as shown in the following formula:

$$t_{nxtsf1} = t_{str1} + \Delta T_{LS} + T_{ggtd} + \Delta tsvdist$$

where $t_{nxtsf1}$ is a local time reference for starting of the next GPS frame, $t_{str1}$ is a local time reference for starting of string 1 of the current GLONASS frame, $\Delta T_{LS}$ is the UTC leap-second offset value, $T_{ggtd}$ is a time difference between GPS and GLONASS master clock (usually in the range of less than 1 μs), and Δtsvdist is the distance difference in time between two GNSS satellites used in the calculation.

Due to the small relative contributions of the terms $T_{ggtd}$ and Δtsvdist, the cumulative leap-second adjustments can be estimated as:

$$\Delta T_{LS} = \text{Round to Second}(t_{nxtsf1} - t_{str1})$$

Thus, the cumulative leap-second adjustment can be determined by identifying a subframe onset time and a string onset time, estimating a most recent GLONASS-frame start time based on the string onset time, estimating a next GPS frame start time based on the subframe onset time, and identifying the time difference separating the frame start times. Because each subframe is six seconds long, this means that the cumulative leap-second adjustment can be estimated within six seconds (as at least one string onset and subframe onset will be identified within that time period). It is therefore unnecessary for a decoder to wait until the next frame is available in order to determine the adjustment.

In some embodiments, the estimation can be made in even less than 6 seconds. This is possible by applying additional assumptions. Specifically, if the estimate of the cumulative leap-second adjustment is constrained to a six-second window, then the estimate can be made by detecting a specific portion of a GPS-signal subframe (e.g., a preamble) and detecting a coinciding GLONASS-signal intra-frame feature (e.g., string number and portion of the string or more string number and when the string began). The estimation can be made without detecting the subframe's number (e.g., prior to analyzing words 2 in the subframe).

An accuracy of the estimation can be unaffected by a six-second window constraint, due to patterns in implementation of new leap-second adjustments. Specifically, leap-second adjustments are rare: only three occurred from 2002-2012. Further, there has never been a negative adjustment. Thus, if a recent cumulative adjustment is known, it is likely that current cumulative adjustment is the same or includes one or two additional positive adjustments. Estimations need not consider the possibility of an addition of many leap seconds within a short time period (e.g., adding 10 leap seconds in one year) as this is historically very unlikely to occur.

The following table provides an example of potential estimated leap-second adjustments based on the year 2011 value of cumulative leap second and hypothetical detected locations of GPSsignal subframe preambles relative to GLONASS-signal string numbers:

| GPS preamble location, corresponding to GLO string. | Unambiguously determined, UTC Offset (Leap Second) Value |
| --- | --- |
| Middle of 8th string | 15 |
| Start of $9^{th}$ string | 16 |
| Middle of $9^{th}$ string | 17 |
| Start of $10^{th}$ string | 18 |
| Middle of $10^{th}$ string | 19 |
| Start of $11^{th}$ string | 20 |

Figure 6:
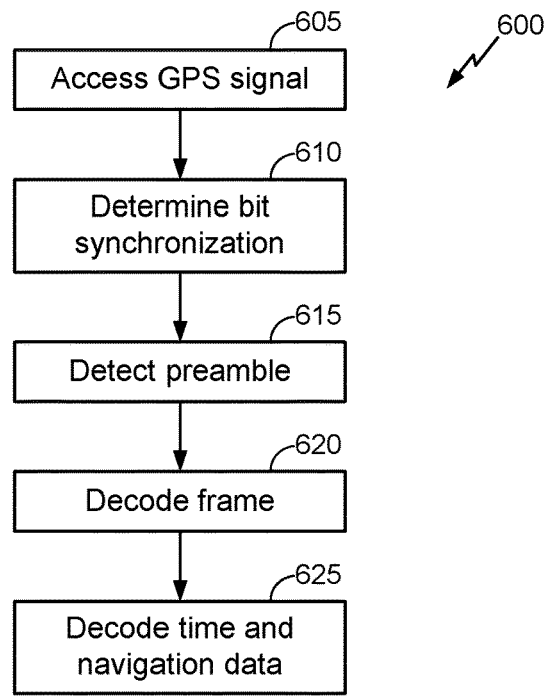
FIG. 6 is a flow diagram of a process for analyzing a GPS signal according to an embodiment of the invention.
Figure 7:
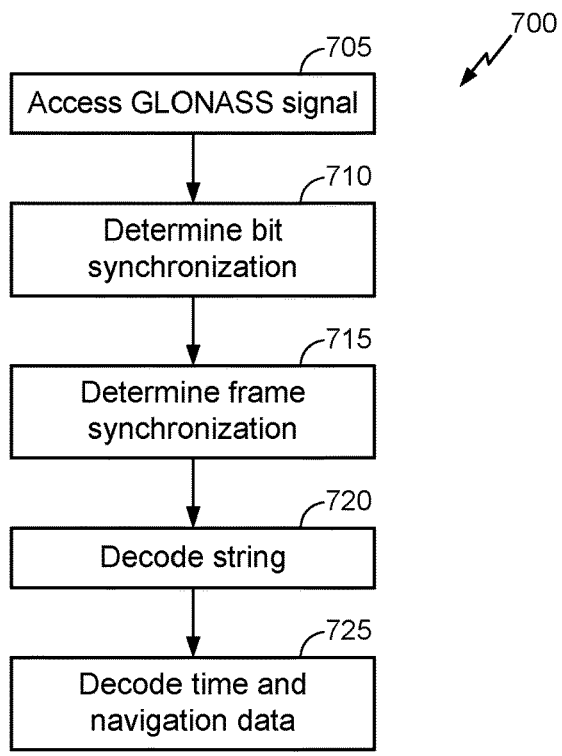
FIG. 7 is a flow diagram of a process for analyzing a GLONASS signal according to an embodiment of the invention.

As described herein, cumulative leap-second adjustments can be estimated by detecting specific frame features in GPS and GLONASS signals. FIGS. 6-7 are flow diagrams of processes for analyzing these signals according to embodiments of the invention. These processes can be performed fully or partly before a cumulative leap-second adjustment is estimated. Each process can be performed by mobile device 105.

FIG. 6 is a flow diagram of a process 600 for analyzing a GPS signal according to an embodiment of the invention. At block 605, a GPS signal is accessed. For example, a signal can be received by GPS receiver 305a from a GPS satellite 110. In some instances, the accessed GPS signal is a "current" signal, indicating that the GPS signal was just received at mobile device 105.

At block 610, bit synchronization is determined. Thus, the receiver's clock can be synchronized to a satellite's clock at the bit level. At block 615, a preamble is detected. For example, a known telemetry word in the preamble can be detected. At block 620, a partial frame, a full frame or multiple frames are decoded. For example, a subframe following the detected preamble can be decoded. Based on the decoded portion of the GPS signal, time and navigation data can be identified at block 625. For example, a signal transmission time can be identified and/or a location (e.g., based on satellite pattern) can be identified.

FIG. 7 is a flow diagram of a process 700 for analyzing a GLONASS signal according to an embodiment of the invention. At block 705, a GLONASS signal is accessed. For example, a signal can be received by GLONASS receiver 305b from a GLONSS satellite 120. In some instances, the accessed GLONASS signal is a "current" signal, indicating that the GLONASS signal was just received at mobile device 105.

At block 710, bit synchronization is determined. Thus, the receiver's clock can be synchronized to a satellite's clock at the bit level. At block 715, frame synchronization is determined. Thus, a location of a string can be detected. At 720, one or more strings can be decoded. Based on the decoded portion of the GLONASS signal, time and navigation data can be identified at block 725.

In some instances, processes 600 and 700 are performed at least once in their entirety prior to estimation of a cumulative leap-second adjustment. In some instances, processes 600 and 700 are subsequently performed one or more times following estimation of a cumulative leap-second adjustment. In some instances, estimation of a cumulative leap-second adjustment is performed during one or both of processes 600 and 700 (e.g., after block 615 or block 715).

As one example, one GPS signal and one GLONASS signal can be analyzed in accordance with processes 600 and 700. A cumulative leap-second adjustment can be estimated based on the signals. A location of mobile device 105 can be estimated based on the decoded time and navigation data from the received signals (and/or from other signals) and from the estimated cumulative leap-second adjustment. The cumulative leap-second adjustment can be estimated at regular intervals (e.g., following June 30 or December 31), and subsequent location estimations can be equated to the most recent leap-second adjustment estimate without repeatedly estimating the value.

Figure 8:
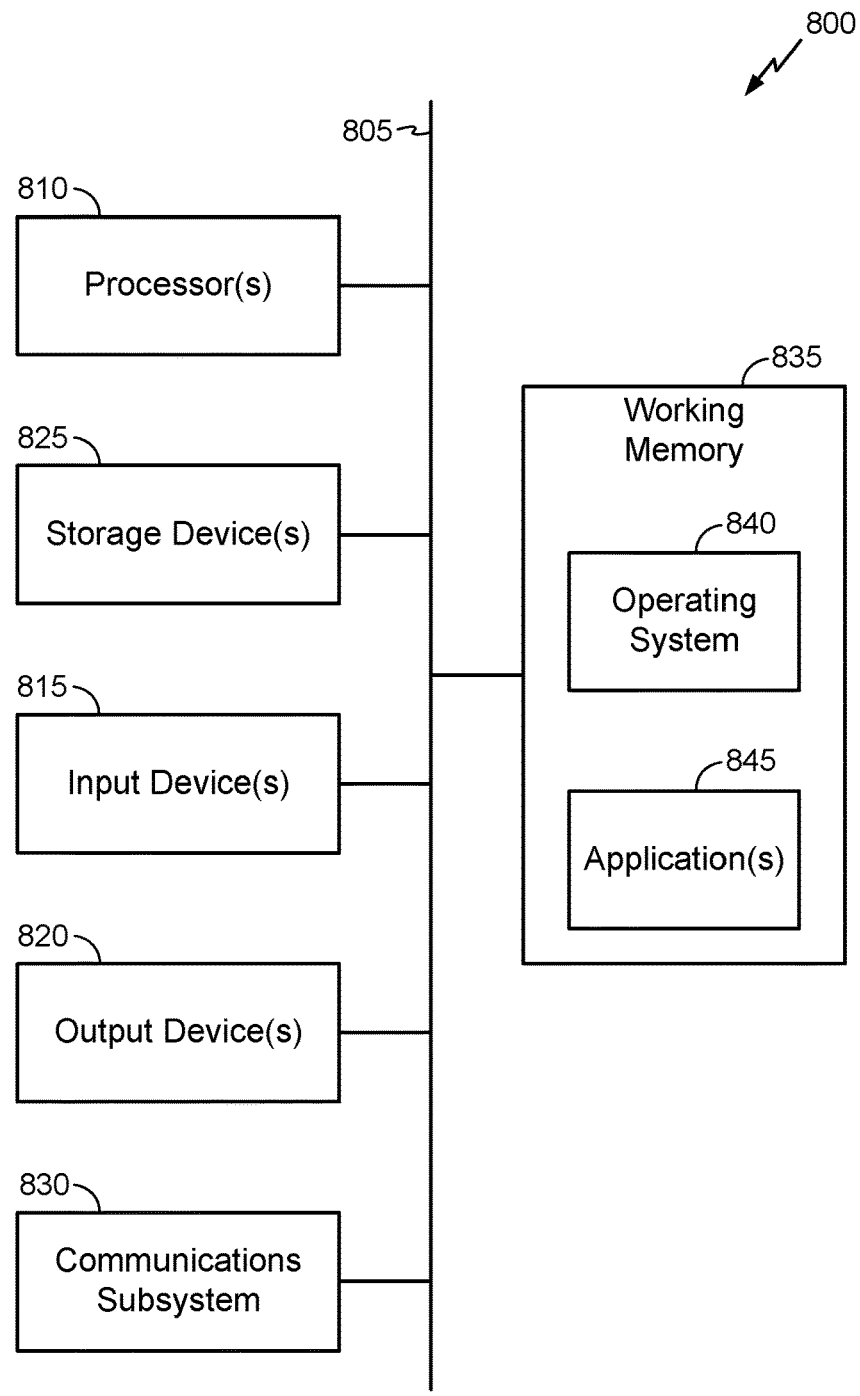
FIG. 8 illustrates an embodiment of a computer system.

A computer system as illustrated in FIG. 8 may be incorporated as part of the previously described computerized devices. For example, computer system 800 can represent some of the components of mobile device 105 and/or remote server 240 FIG. 8 provides a schematic illustration of one embodiment of a computer system 800 that can perform all or part of methods described herein the methods described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

Computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

Computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

Computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, computer system 800 will further comprise a working memory 835, which can include a RAM or ROM device, as described above.

Computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by computer system 800 and/or might take the form of source and/or installable code, which, upon compilation and/or installation on computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as computer system 800) to perform methods in accordance with various embodiments of the invention. According to a set of embodiments, some or all of the procedures of such methods are performed by computer system 800 in response to processor 810 executing one or more sequences of one or more instructions (which might be incorporated into operating system 840 and/or other code, such as an application program 845) contained in working memory 835. Such instructions may be read into working memory 835 from another computer-readable medium, such as one or more of storage device(s) 825. Merely by way of example, execution of the sequences of instructions contained in working memory 835 might cause processor(s) 810 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using computer system 800, various computer-readable media might be involved in providing instructions/code to processor(s) 810 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as storage device(s) 825. Volatile media include, without limitation, dynamic memory, such as working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for estimating cumulative leap-second adjustments indicating a combined total of implemented leap-second adjustments in a Global Navigation Satellite System (GLONASS) time, the method comprising:
   accessing, by an electronic device, a GLONASS signal;
   accessing, by the electronic device, a Global Position System (GPS) signal or a GPS time;
   determining, by the electronic device, a frame-related feature of the GLONASS signal coinciding in time with a frame related feature of the accessed GPS signal or being associated with the accessed GPS time;
   estimating, by the electronic device, the cumulative leap-second adjustments based on analyzing an alignment of the determined frame-related feature of the GLONASS signal with respect to said GPS signal or based on the accessed GPS time corresponding to the determined frame-related feature of the GLONASS signal; and
   adjusting a time of the electronic device using the estimated cumulative leap-second adjustments.

2. The method of claim 1, wherein the frame-related feature of the GLONASS signal comprises a string number of the GLONASS signal temporally coincident with an element of a frame of the GPS signal or a specific subframe in said GPS signal.

3. The method of claim 2, wherein the frame-related feature of the GLONASS signal comprises a string number and an intra-string location of the GLONASS signal temporally coincident with a preamble of a subframe in the GPS signal.

4. The method of claim 1, further comprising constraining the estimate of the cumulative leap-second adjustments based on a maximum number.

5. The method of claim 1 further comprising adjusting a time associated with said GPS signal based on the estimated cumulative leap-second adjustments.

6. A non-transitory computer-readable medium comprising processor-executable instructions configured to cause a processor to:
   access a GLONASS signal;
   access a Global Position System (GPS) signal or a GPS time;
   determine a frame-related feature of the GLONASS signal coinciding in time with a frame related feature of the accessed GPS signal or being associated with the accessed GPS time;
   estimate the cumulative leap-second adjustments based on analyzing an alignment of the determined frame-related feature of the GLONASS signal with respect to said GPS signal or based on the accessed GPS time corresponding to the determined frame-related feature of the GLONASS signal; and adjusting a time of an electronic device using the estimated cumulative leap-second adjustments.

7. The non-transitory computer-readable medium of claim 6, wherein the frame-related feature of the GLONASS signal comprises a string number of the GLONASS signal temporally coincident with an element of a frame of the GPS signal or a specific subframe in said GPS signal.

8. The non-transitory computer-readable medium of claim 7, wherein the frame-related feature of the GLONASS signal comprises a string number and an intra-string location of the GLONASS signal temporally coincident with a preamble of a subframe in the GPS signal.

9. The non-transitory computer-readable medium of claim 6, wherein the processor-executable instructions are further configured to cause the processor to constrain the estimate of the cumulative leap-second adjustments based on a maximum number.

10. The non-transitory computer-readable medium of claim 6, wherein the processor-executable instructions are further configured to cause the processor to adjust a time associated with said GPS signal based on the estimated cumulative leap-second adjustments.

11. A system for estimating cumulative applied leap-second adjustments indicating a combined total of implemented leap-second adjustments in a Global Navigation Satellite System (GLONASS) time, the system comprising:
means for accessing a GLONASS signal;
means for accessing a Global Position System (GPS) signal or a GPS time;
means for determining a frame-related feature of the GLONASS signal coinciding in time with a frame-related feature of the accessed GPS signal or being associated with the accessed GPS time;
means for estimating cumulative leap-second adjustments based on analyzing an alignment of the determined frame-related feature of the GLONASS signal with respect to said GPS signal or based on the accessed GPS time corresponding to the determined frame-related feature of the GLONASS signal; and
means adjusting a time of an electronic device using the estimated cumulative leap-second adjustments.

12. The system of claim 11, further comprising:
means for accessing said GPS signal;
means for determining said frame-related feature of the GPS signal; and
means for comparing the frame-related feature of the GLONASS signal to the frame-related feature of the GPS signal.

13. The system of claim 12, wherein the means for comparing the frame-related feature of the GLONASS signal to the frame-related feature of the GPS signal comprises a clock, such that a coincidence between the frame features can be detected.

14. The system of claim 12, wherein the means for accessing the GLONASS signal and the means for accessing the GPS signal comprises a single receiver configured to receive signals from GLONASS satellites and GPS satellites.

15. The system of claim 11, wherein the frame-related feature of the GLONASS signal comprises a string number of the GLONASS signal temporally coincident with an element of a frame of the GPS signal or a specific subframe in said GPS signal.

16. The system of claim 15, wherein the frame-related feature of the GLONASS signal comprises a string number and an intra-string location of the GLONASS signal temporally coincident with a preamble of a subframe in the GPS signal.

17. A device for estimating cumulative leap-second adjustments indicating a combined total of implemented leap-second adjustments in a Global Navigation Satellite System (GLONASS) time comprising:
a clock;
one or more receivers configured to receive a GLONASS signal from a GLONASS satellite and to receive a Global Positioning System (GPS signal from a GPS satellite
a non-transitory computer-readable medium; and
a processor in communication with the non-transitory computer-readable medium, the processor configured to execute processor-executable instructions stored in the non-transitory computer-readable medium, the processor-executable instructions configured to cause a processor to:
access the GLONASS signal;
access the Global Position System (GPS) signal or a GPS time;
determine a frame-related feature of the GLONASS signal coinciding in time with a frame related feature of the accessed GPS signal or being associated with the accessed GPS time;
estimate the cumulative leap-second adjustments based on analyzing an alignment of the determined frame-related feature of the GLONASS signal with respect to said GPS signal or based on the accessed GPS time corresponding to the determined frame-related feature of the GLONASS signal; and
adjust a time of the clock using the estimated cumulative leap-second adjustments.

18. The device of claim 17, wherein the frame-related feature of the GLONASS signal comprises a string number of the GLONASS signal temporally coincident with an element of a frame of the GPS signal or a specific subframe in said GPS signal.

19. The device of claim 18, wherein the frame-related feature of the GLONASS signal comprises a string number and an intra-string location of the GLONASS signal temporally coincident with a preamble of a subframe in the GPS signal.

20. The device of claim 17, wherein the processor-executable instructions are further configured to cause the processor to constrain the estimate of the cumulative leap-second adjustments based on a maximum number.

21. The device of claim 17, wherein the processor-executable instructions are further configured to cause the processor to adjust a time associated with said GPS signal based on the estimated cumulative leap-second adjustments.

* * * * *